United States Patent [19]
Zerby

[11] 4,303,097
[45] Dec. 1, 1981

[54] DIGITAL FLUID FLOW CONTROL APPARATUS

[75] Inventor: Lawrence G. Zerby, Mission Viejo, Calif.

[73] Assignee: Powell Industries, Inc., Houston, Tex.

[21] Appl. No.: 95,292

[22] Filed: Nov. 19, 1979

[51] Int. Cl.³ .............................................. G05D 7/03
[52] U.S. Cl. .................................... 137/599; 251/367
[58] Field of Search ................. 137/599, 601; 251/367

[56] References Cited

U.S. PATENT DOCUMENTS

| | | | |
|---|---|---|---|
| 3,331,393 | 7/1967 | Ernyel | 137/599 |
| 3,351,089 | 11/1967 | Garrahan | 137/599 |
| 3,375,845 | 4/1968 | Behm | 137/599 X |
| 3,502,105 | 3/1970 | Ernyei et al. | 137/599 |
| 3,726,296 | 4/1973 | Friedland | 137/599 X |
| 3,937,248 | 2/1976 | Hutton | 137/599 X |
| 4,019,533 | 4/1977 | Jerde | 137/599 |
| 4,199,006 | 4/1980 | Thalhamer | 137/599 |
| 4,248,263 | 2/1981 | Langill et al. | 137/599 X |

*Primary Examiner*—Robert G. Nilson
*Attorney, Agent, or Firm*—Christie, Parker & Hale

[57] ABSTRACT

Digital fluid flow control apparatus comprises a generally cylindrical valve body (10) having a cylindrical axis. An inlet (27) to the valve has an axis extending radially from the cylindrical axis. An outlet (29) from the valve has an axis extending radially from the cylindrical axis in alignment with the inlet axis. A cylindrical manifold (20) is coaxially disposed in the valve body in a laterally displaced relationship with the inlet and outlet. An annular manifold (24) is coaxially disposed in the valve body in laterally spaced relationship with the inlet and outlet. The annular manifold lies between the cylindrical manifold and the inlet and outlet and surrounds a portion of the valve body. A passage (21, 25) extends through the valve body from the inlet to one of the manifolds. Another passage (30) extends through the valve body from the outlet to the other manifold. The passage to the cylindrical manifold passes through the portion of the valve body (31) surrounded by the annular manifold. A plurality of digital bistable valve elements (40) connect the cylindrical manifold and the annular manifold.

28 Claims, 5 Drawing Figures

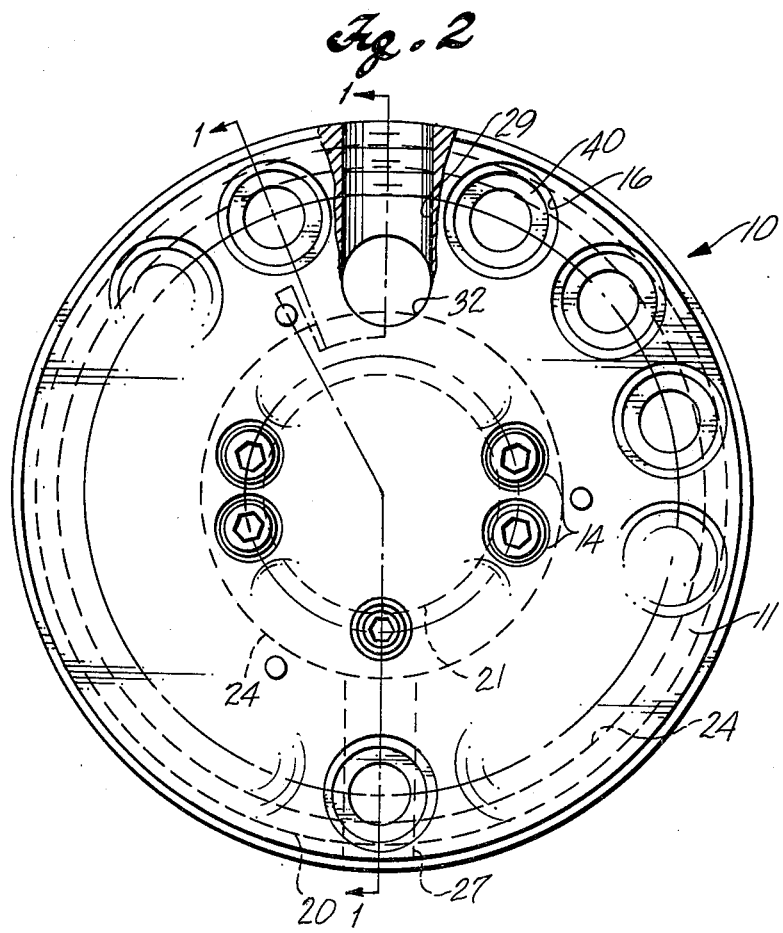

DIGITAL FLUID FLOW CONTROL APPARATUS

BACKGROUND OF THE INVENTION

This invention relates to the field of process control and, more particularly, to digital fluid flow control apparatus.

Digital fluid flow control has been practiced for many years. A plurality of individually actuatable bistable, i.e., ON/OFF, valve elements are connected in parallel between an upstream manifold and a downstream manifold. The valve elements have orifices that are weighted in area, usually according to a geometric progression. By selectively opening and closing different combinations of valve elements, the fluid flow rate can be controlled over a wide range from zero to a maximum value. Typical digital fluid flow control apparatus is disclosed in U.S. Pat. No. 3,746,041, which is assigned to the assignee of the present application.

Because of the large number of bistable valve elements, digital fluid flow apparatus has many more parts than its analog counterpart. For this reason, it is important that these parts be readily accessible for inspection, cleaning, and repair, and that assembly of the parts be simplified. It is also advantageous to be able to take the parts off line for inspection, cleaning, or repair without taking the apparatus out of the fluid line in which it is operating. Further, it is desirable to have a single valve design that can be scaled to fluid lines having a wide range of diameters.

To facilitate manufacture, it is desirable that the valve body be capable of fabrication without necessity for welding or casting. Greater reliability can be achieved if the parts of such housing have face seals rather than piston seals.

SUMMARY OF THE INVENTION

The invention provides digital fluid control apparatus in which the parts are easily accessible for off-line inspection, cleaning, and repair without removal of the apparatus from the fluid line. The apparatus can be scaled to fluid lines having a wide range of diameters. The parts of the valve body have face seals and need not be fabricated by welding or casting, although they can be cast if desired.

One feature of the invention is a two-part valve body for digital fluid flow control apparatus. The two parts of the valve body have flat abutting faces. A cavity is formed in one part and is surrounded by at least a portion of the flat face of that part to form with the other flat face a first manifold. A second manifold is formed in the other part. The parts of the valve body are releasably secured with the flat faces in abutment. The parts of the valve body are sealed, preferably by a face seal between the flat faces, and the parts are secured by a clamp that urges the flat faces together against the face seal. In one embodiment, the part in which the second manifold is formed comprises subparts that are also releasably secured.

According to another feature of the invention, a valve body for digital fluid flow control apparatus has first and second laterally displaced cylindrical manifolds with aligned axes, an inlet port transverse to the manifold axes, and an outlet port transverse to the manifold axes. The first manifold lies between the second manifold and both ports.

According to the invention, a generally cylindrical valve body has a cylindrical axis, an inlet to the valve body has an axis extending radially from the cylindrical axis, and an outlet from the valve body has an axis extending radially from the cylindrical axis in the same plane as the inlet axis. A cylindrical manifold is coaxially disposed in the valve body in laterally displaced relationship with the inlet and outlet. An annular manifold is coaxially disposed in the valve body in laterally spaced relationship with the inlet and outlet; the annular manifold lies between the cylindrical manifold and the inlet and outlet and surrounds a portion of the valve body. A passage extends through the valve body from the inlet to one of the manifolds. Another passage extends through the valve body from the outlet to the other manifold. The passage to the cylindrical manifold passes through the portion of the valve body surrounded by the annular manifold. A plurality of digital bistable valve elements connect the cylindrical manifold and the annular manifold. Preferably the inlet axis and outlet axis are aligned with each other. Fluid flowing through the described valve body traverses more than a 360° path.

BRIEF DESCRIPTION OF THE DRAWINGS

The features of specific embodiments of the best mode contemplated of carrying out the invention are illustrated in the drawings in which:

FIG. 2, is a top plan view of the apparatus of FIG. 1 with the cover removed;

DETAILED DESCRIPTION OF THE SPECIFIC EMBODIMENTS

The disclosure of application Ser. No. 17,693, now U.S. Pat. No. 4,248,263 filed Mar. 5, 1979, is incorporated herein by reference.

Figure 1:
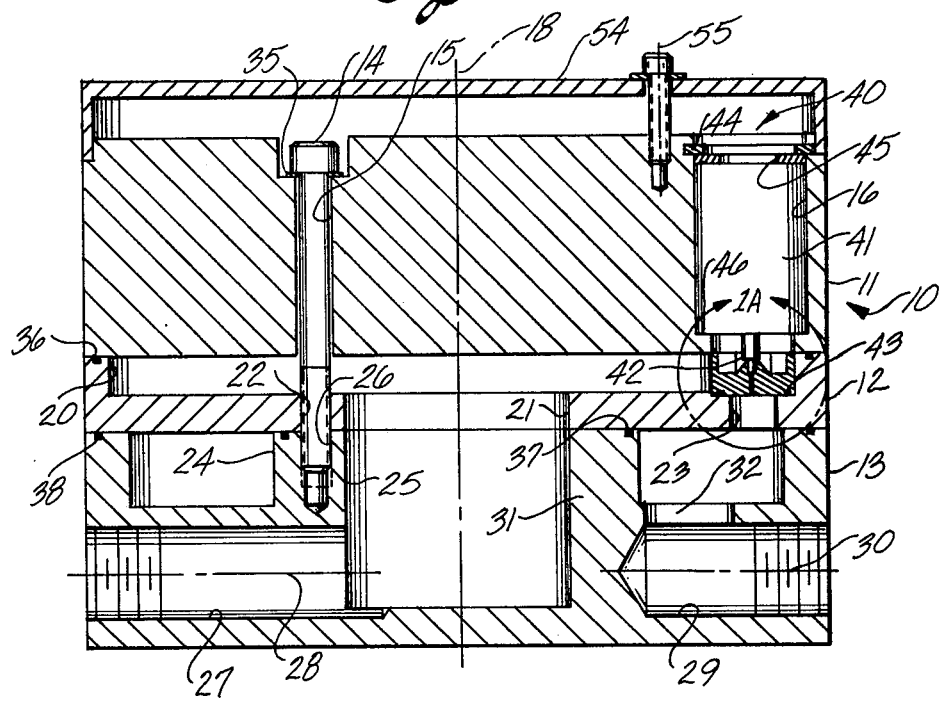
FIG. 1 is a side-sectional view of apparatus incorporating the principles of the invention in a valve body fabricated from machined parts.
Figure 1A:
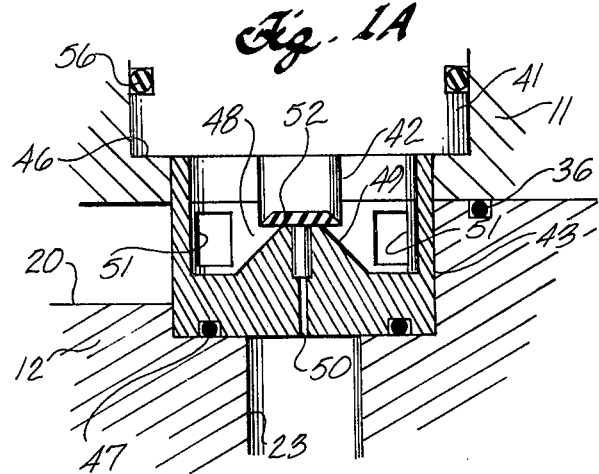
FIG. 1A is an enlargement of a designated portion of FIG. 1.

In FIGS. 1 and 2, a generally cylindrical valve body 10 having a cylindrical axis 18 comprises separate generally cylindrical parts 11, 12, and 13 which are clamped together by a plurality of screw fasteners 14. Parts 11, 12, and 13 are formed by machining cylindrical billets. Parts 13 and 12 have respective first and second flat abutting faces and parts 12 and 11 have respective third and fourth flat abutting faces. The third flat face surrounds recess 20. Part 11 has a plurality of screw receiving bores 15, e.g., twelve in number, arranged in a ring around axis 18 in parallel relationship thereto and a plurality of larger valve element receiving bores 16, e.g., thirteen in number, arranged in a ring around bores 15 in parallel relationship to axis 18. Part 12 has a coaxial cylindrical recess 20 with a diameter almost as large as part 12 formed at one end face adjacent to part 11 and a short coaxial bore 21 connecting recess 20 to the other end face of part 12. Part 12 also has a plurality of screw receiving bores 22 equal in number to and aligned with bores 15 and a plurality of bores 23 equal in number to and aligned with bores 16. Bores 22 and 23 each extend through part 12 from the floor of recess 20 to the opposite end face thereof. Part 13 has adjacent to part 12 an annular coaxial cavity or recess 24 surrounding a portion 31 of part 13, a cylindrical coaxial cavity or recess 25 surrounded by recess 24, and a plurality of threaded bores 26 equal in number to and aligned with bores 22 and 15. One portion of the first flat face surrounds recess 25 and another portion thereof surrounds recess 24. A threaded bore 27 having an axis 28 extending radially from axis 18 is formed in part 13 from the outer cylindrical surface thereof to recess 25. A threaded bore 29 having an axis 30 extending radially from axis 18 in alignment with axis 28 is formed in part 13 from its outer cylindrical surface to a depth short of recess 25. A bore 32 parallel to axis 18 extends between recess 24 and bore 29.

Screw fasteners 14 extend through bores 15 and 22 and are threaded into bores 26 to releasably secure parts 11, 12, and 13. A face seal 35 is disposed between the head of each screw fastener 14, preferably recessed as shown, and the adjacent surface of part 11. A face seal 36 is retained in an annular groove formed in the third flat end face, i.e., the end face of part 12 adjacent to part 11. Seal 36 is disposed around the third flat face to prevent fluid leakage from recess 20 to the exterior of valve body 10 between the third and fourth flat faces. Face seals 37 and 38 are retained in annular grooves formed in the first flat end face, i.e., the end face of part 13 adjacent to part 12 on the inside and outside, respectively, of recess 24. Thus, face seal 38 is disposed around the portion of the first face surrounding recess 24, to prevent fluid leakage from recess 24 to the exterior of valve body 10 between the first and second faces, and face seal 37 is disposed around the portion of the first flat face surrounding recess 25 to prevent fluid leakage between recesses 24 and 25 through the interface formed by the first and second flat faces. Face seals 35 through 38 serve to seal the interior of valve body 10 effectively without necessity for piston seals, which are inherently less reliable than face seals.

A plurality of individually actuatable bistable digital valve elements 40, e.g., thirteen in number, are disposed in bores 16. Each valve element 40 comprises an electromagnetic actuator 41, a plunger 42, and a cylindrical orifice block 43, which may be attached to actuator 41. Valve element 40 is retained in bore 16 by a snap ring 44. Snap ring 44 bears against a washer 45, which in turn bears against the end of actuator 41 to urge it toward a shoulder 46 formed in bore 16. An O-ring 56 is retained in an annular groove around actuator 41 to seal the interface between bore 16 and actuator 41. Instead of an O-ring, a face seal could engage shoulder 46. Actuator 41 and plunger 42 could be constructed in the manner described in connection with FIG. 1 of the referenced co-pending application. Orifice block 43 lies in a shallow counter bore formed in bore 23 adjacent to recess 20. A face seal 47 is retained in an annular recess formed in the surface of orifice block 43 adjacent to part 12. Orifice block 43 has a cylindrical recess 48 facing toward actuator 41 and a central valve seat 49 extending from the floor of recess 48 toward actuator 41 in alignment with plunger 42. The end of plunger 42 adjacent to valve seat 49 has an elastomeric sealing insert 52. An orifice 50 is formed by a bore and counter bore extending through orifice block 43 from valve seat 49 to bore 23. Orifice 50 is the flow controlling orifice of the valve element, which determines the weighting assigned to such valve element. Instead of an orifice, a converging-diverging nozzle could be provided as shown in FIG. 1 of the referenced co-pending application. The cylindrical side walls of orifice block 43 have slots 51, which permit fluid communication between recess 20 and recess 48. A binary electrical signal drives actuator 41. When the binary signal is one value, plunger 42 is driven against valve seat 49 as shown in FIG. 1 to seal orifice 50; when the binary signal is the other value, plunger 42 is retracted into actuator 41 to permit fluid flow through orifice 50. The term bistable valve element as used herein refers to a valve element having a plug or plunger that assumes one of two stable positions, namely, open or closed, depending upon the pressure balancing of the plug element and/or the bistable nature of the actuator and/or electrical driving signal.

A protective cover 54 is attached to part 11 by fasteners 55.

Bore 27 serves as an inlet to valve body 10; recess 20 and the adjacent end face of part 11, i.e., the fourth flat end face, define a cylindrical upstream manifold, bore 21 and recess 25 define an upstream connecting passage from the inlet to the cylindrical manifold; bore 29 serves as an outlet from valve body 10; recess 24 and the adjacent end face of part 12, i.e., the second flat end face, define an annular downstream manifold and bore 32 defines a downstream connecting passage from the outlet to the annular manifold. The downstream manifold is disposed in valve body 10 in laterally spaced relationship with the inlet and outlet and lies between the upstream manifold and the inlet and outlet. Fluid flowing into the inlet makes a 90° change of direction at the upstream connecting passage and another 90° change of direction at the cylindrical manifold. Such fluid flows from the cylindrical manifold to the annular manifold through the open valve elements, the fluid flow rate depending upon the weighting assigned to the open valve elements. Fluid flowing through the open valve elements from the cylindrical manifold makes a 90° change in direction and another 90° change in direction as it flows into the annular manifold. The fluid flows around the annular manifold to the outlet connecting passage where it makes another 90° change in direction as it flows through such passage and finally yet another 90° change in direction as it flows into the outlet. Thus, the fluid bends more than 360° as it traverses through valve body 10. This unique fluid travel configuration permits valve body 10 to be fabricated without welding from machined parts, i.e., parts 11, 12, and 13, which are sealed only by face seals, i.e., seals 35 through 38.

In order to gain access to the interior of valve body 10 for inspection, cleaning, and repair, it is only necessary to remove fasteners 55 and bolts 14 and break apart parts 11, 12, and 13; it is not necessary to remove valve elements 40 from part 11 unless a specific one of such valve elements requires cleaning or repair.

Figure 3:
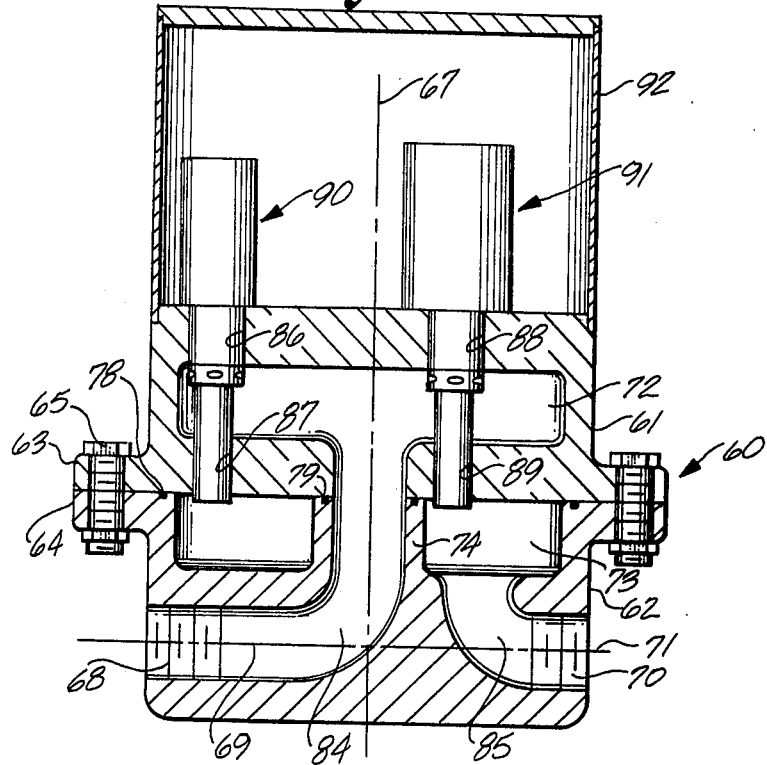
FIG. 3, is a side-sectional view of apparatus incorporating the principles of the invention in a valve body fabricated from cast parts.
Figure 4:
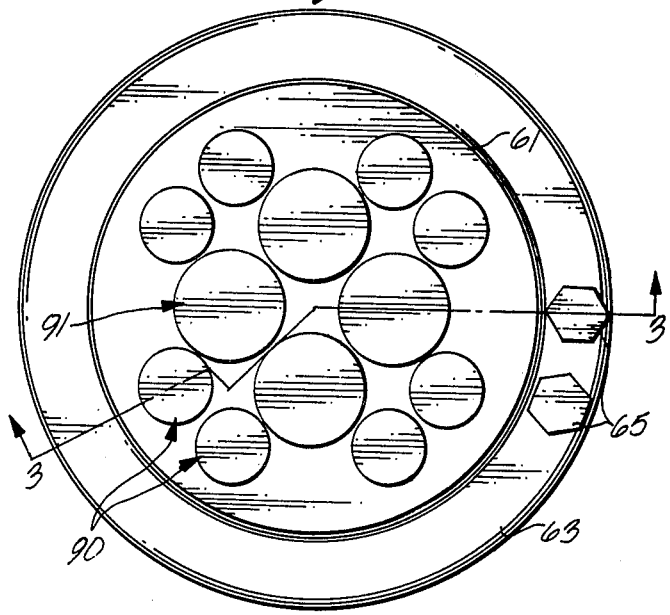
FIG. 4, is a top plan view of the apparatus of FIG. 3 with the cover removed.

In FIGS. 3 and 4, a valve body 60 comprises cast parts 61 and 62 that have abutting mounting flanges 63 and 64, respectively. Flanges 63 and 64 are held together by bolts 65. When assembled as shown, valve body 60 has the same internal configuration as valve body 10 of FIGS. 1 and 2. Specifically, it has a cylindrical axis 67, a threaded inlet 68 with an axis 69 extending radially from cylindrical axis 67; and outlet 70 with an axis 71 extending radially from cylindrical axis 67 in alignment with axis 69; a cylindrical manifold 72 coaxially disposed in valve body 60 in laterally displaced relationship with inlet 68 and outlet 70, and an annular manifold 73 coaxially disposed in valve body 60 in laterally spaced relationship with inlet 68 and outlet 70. Annular manifold 73 lies between cylindrical manifold 72 and inlet 68 and outlet 70 and surrounds a portion 74 of part 62. Face seals 78 and 79 are retained in annular grooves formed in the end face of part 62 adjacent to part 61 on the inside and outside, respectively, of annular manifold 73 to seal the interface between parts 61 and 62. A passage 84 extends through valve body 60 including portion 74, from inlet 68 to cylindrical manifold 72. A passage 85 extends through valve body 60 from outlet 70 to annular manifold 74. Since valve body 60 is cast, passages 84 and 85 are elbow shaped to provide the smoothest possible flow channel. Part 61 has a plurality of axially aligned pairs of bores 86 and 87, e.g., eight in number, arranged in a ring around axis 67, and a plurality of axially aligned pairs of bores 88 and 89, e.g., four in number, arranged in a ring around axis 67 inside of bores 86 and 87. A plurality of small valve elements 90 are mounted in the respective bores 86 and 87 and a plurality of large valve elements 91 are mounted in the respective bores 88 and 89. Valve elements 90 and 91 could, for example, take the form shown in FIG. 3 of the referenced co-pending application. A protective cover 92 fits over valve elements 90 and 91 at the end of part 61 opposite part 62.

In order to gain access to the interior of valve body 60 for cleaning and repair of parts of the apparatus, it is only necessary to open bolts 65 and break parts 61 and 62 apart at their interface. Valve elements 90 and 91 do not need to be removed from part 61 unless a particular one of these valve elements needs to be cleaned or repaired.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the direction of fluid flow through the described valve bodies could be reversed. With reference to FIG. 1, bore 29 could be the inlet, bore 27 could be the outlet, recess 24 could define the upstream manifold, and recess 20 could define the downstream manifold. Further, although an inlet and outlet in the same plane is usually preferable, inlet 27 could be aligned with axis 11 or at another orientation. Moreover, instead of cast elbows, the passages in FIGS. 3 and 4 could be bored to form right angle passages.

What is claimed is:

1. Digital fluid flow control apparatus comprising:
 a generally cylindrical valve body having a cylindrical axis;
 an inlet port to the valve body having an axis;
 an outlet port from the valve body having an axis;
 a cylindrical manifold coaxially disposed in the valve body in laterally displaced relationship with at least one of the ports;
 an annular manifold coaxially disposed in the valve body in laterally spaced relationship with the cylindrical manifold, the annular manifold lying between the cylindrical manifold and the inlet and outlet ports and surrounding a portion of the valve body;
 a passage extending through the valve body from the inlet port to one of the manifolds;
 a passage extending through the valve body from the outlet port to the other manifold, the passage to the cylindrical manifold passing through the portion of the valve body surrounded by the annular manifold; and
 a plurality of digital bistable valve elements connecting the cylindrical manifold and the annular manifold.

2. The apparatus of claim 1, in which the inlet and outlet axes extend radially from the cylindrical axis in the same plane.

3. The apparatus of claim 2, in which the inlet and the outlet axes are aligned with each other.

4. The apparatus of claim 1, in which the valve body comprises first, second and third generally cylindrical parts, the first and second parts having adjacent end faces and the second and third parts having adjacent end faces, the cylindrical manifold being defined by a first recess formed at one end face of the second part and the adjacent end face of the first part, the annular manifold being defined by a second recess formed at the end face of the third part and the adjacent end face of the second part, the inlet and outlet being defined by radial bores formed in the third part, the passage to the cylindrical manifold being formed by bores in the second and third parts aligned with the cylindrical axis, and the passage to the annular manifold being formed by a bore laterally displaced from the cylindrical axis.

5. The apparatus of claim 4, additionally comprising:
 a face seal around the first recess between the adjacent end faces of the first and second parts;
 a face seal around the second recess between the adjacent end faces of the second and third parts; and
 a face seal surrounded by the second recess between the adjacent end faces of the second and third parts.

6. The apparatus of claim 1, in which the valve body comprises first and second generally cylindrical parts, the cylindrical manifold being formed by a cavity within the first part, the annular manifold being formed by an annular recess at one end of the second part and the adjacent end of the first part.

7. The apparatus of claim 6, in which the passages are elbow shaped.

8. The apparatus of claim 6, additionally comprising a face seal around the annular recess between the adjacent end faces of the first and second parts and a face seal surrounded by the annular recess between the adjacent end faces of the first and second parts.

9. Digital fluid flow control apparatus comprising:
 a valve body having separate first and second parts with respective first and second flat abutting faces;
 a cavity formed in the first part and surrounded by at least a portion of the first flat face to form with the second flat face a first manifold;
 a second manifold formed in the second part;
 an inlet to the valve body in communication with one manifold;
 an outlet from the valve body in communication with the other manifold;
 means for releasably securing the parts with the flat faces in abutment;
 means for sealing the valve body to prevent fluid leakage from the first manifold between the flat faces; and
 a plurality of digital bistable valve elements connecting the first and second manifolds.

10. The apparatus of claim 9, in which the sealing means comprises a face seal disposed between the portion of the first flat face and the second flat face and the securing means comprises means for clamping the flat abutting faces together.

11. The apparatus of claim 10, in which the second manifold lies on one side of the first manifold and the inlet and outlet lie on the other side of the first manifold.

12. The apparatus of claim 11, in which the cavity surrounds a portion of the flat face of the first part and the inlet and outlet are formed in the first part, the apparatus additionally comprising a first passage extending through the first part from the inlet or outlet to the portion of the first flat face surrounded by the cavity, a second passage extending in alignment with the first passage through the second part from the second flat face to the second manifold, and means for sealing the valve body to prevent fluid leakage between the first manifold and the first passage between the flat faces.

13. The apparatus of claim 12, in which the last named sealing means comprises a face seal between the second face and the portion of the first face surrounded by the cavity and the securing means comprises means for clamping the faces together.

14. The apparatus of claim 13, in which the second part of the valve body further has first and second subparts with respective third and fourth flat abutting faces, a cavity formed in the first subpart and surrounded by the third flat face to form with the fourth flat face the second manifold, and means for sealing the valve body to prevent fluid leakage from the second manifold between the third and fourth flat faces.

15. The apparatus of claim 14, in which the sealing means of the second manifold comprises a face seal between the third and fourth faces.

16. The apparatus of claim 15, in which the valve elements comprise passages through the second part between the second manifold and the second face adjacent to the cavity and means for individually opening and closing the passages to control fluid flow between the manifolds.

17. The apparatus of claim 16, in which the second part additionally comprises a plurality of actuator receiving passages extending between the second manifold and the exterior of the second part, the actuator receiving passages being equal in number to, and aligned with, the passages of the valve elements, the opening and closing means comprising actuators mounted in the actuator-receiving passages and plugs operated by the actuators for opening and closing the respective passages of the valve elements.

18. The apparatus of claim 9, in which the second manifold lies on one side of the first manifold and the inlet and outlet lie on the other side of the first manifold in the first part.

19. The apparatus of claim 9, in which the second part of the valve body further has first and second subparts with respective third and fourth flat abutting faces, a cavity formed in the first subpart and surrounded by the third flat face to form with the fourth flat face the second manifold, and means for sealing the valve body to prevent fluid leakage from the second manifold between the third and fourth flat faces.

20. The apparatus of claim 19, in which the sealing means comprises a face seal between the third and fourth faces and the securing means comprises means for clamping the subparts together.

21. The apparatus of claim 9, in which the valve elements comprise passages through the second part between the second manifold and the second face adjacent to the cavity and means for individually opening and closing the passages to control fluid flow between the manifolds.

22. The apparatus of claim 21, in which the second part additionally comprises a plurality of actuator receiving passages extending between the second manifold and the exterior of the second part, the actuator receiving passages being equal in number to, and aligned with, the passages of the valve elements, the opening and closing means comprising actuators mounted in the actuator-receiving passages and plugs operated by the actuators for opening and closing the respective passages of the valve elements.

23. Digital fluid flow control apparatus comprising:
a valve body lying on an axis;
an inlet port to the valve body having an axis;
an outlet port from the valve body having an axis;
a first manifold disposed in the valve body in laterally displaced relationship with at least one of the ports;
a second manifold disposed in the valve body in laterally spaced relationship with the first manifold, the first manifold lying between the second manifold and the one port and surrounding a portion of the valve body;
a passage extending through the valve body from the inlet port to one of the manifolds;
a passage extending through the valve body from the outlet port to the other manifold, the passage to the second manifold passing through the portion of the valve body surrounded by the first manifold; and
a plurality of digital bistable valve elements connecting the first and second manifolds.

24. Digital fluid flow control apparatus comprising:
a valve body having a valve body axis;
an inlet port to the valve body with an inlet axis transverse to the valve body axis;
an outlet port from the valve body with an outlet axis transverse to the valve body axis;
a first manifold disposed in the valve body in laterally displaced relationship with both ports, the first manifold having cylindrical side walls extending around a cylindrical axis aligned with the valve body axis;
a second manifold disposed in the valve body in laterally spaced relationship with the first manifold, the first manifold lying between the second manifold and both ports and having cylindrical side walls extending around a cylindrical axis aligned with the valve body axis;
a passage extending through the valve body from the inlet port to one of the manifolds;
a passage extending through the valve body from the outlet port to the other manifold; and
a plurality of digital bistable valve elements connecting the first and second manifolds.

25. The apparatus of claim 24, in which the inlet and outlet axes are aligned.

26. Digital fluid flow control apparatus comprising:
a valve body having separate first and second parts with respective first and second flat abutting faces;
a cavity formed in one part and surrounded by at least a portion of the corresponding flat face to form with the other flat face a first manifold;
a second manifold formed in the other part;
an inlet to the valve body formed in the first part in communication with one manifold;
an outlet from the valve body formed in the first part in communication with the other manifold;

means for releasably securing the parts with the flat faces in abutment;

means for sealing the valve body to prevent the fluid leakage from the first manifold between the flat faces; and a plurality of digital bistable valve elements connecting the first and second manifolds.

27. The apparatus of claim 26, in which the cavity is formed in the first part and the second manifold is formed in the second part.

28. The apparatus of claim 27, in which the sealing means comprises a face seal disposed between the portion of the first flat face and the second flat face and the securing means comprises means for clamping the flat abutting faces together.

* * * * *